United States Patent
Haikin

(10) Patent No.: US 8,014,028 B2
(45) Date of Patent: Sep. 6, 2011

(54) INTENT PRESERVATION WHEN CONSTRUCTING MEASUREMENT-BASED COLOR TRANSFORMS FROM TRANSFORM-BASED PROFILES

(75) Inventor: John Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 543 days.

(21) Appl. No.: 12/123,430

(22) Filed: May 19, 2008

(65) Prior Publication Data

US 2009/0284763 A1    Nov. 19, 2009

(51) Int. Cl.
  *H04N 1/60*    (2006.01)
(52) U.S. Cl. ......... 358/1.9; 358/518; 358/523; 358/524; 345/590; 345/597
(58) Field of Classification Search ............ 358/1.9, 358/518, 520, 523, 524; 345/590, 597
See application file for complete search history.

(56) References Cited

U.S. PATENT DOCUMENTS

| | | | |
|---|---|---|---|
| 6,400,843 B1 | 6/2002 | Shu et al. | 382/167 |
| 6,720,973 B2 | 4/2004 | Butler | 345/604 |
| 6,922,266 B2 | 7/2005 | Hiramatsu | 358/518 |
| RE39,161 E | 7/2006 | Edge et al. | 345/601 |
| 7,796,296 B2 * | 9/2010 | Martinez et al. | 358/1.9 |
| 2005/0249403 A1 | 11/2005 | Haikin | 382/162 |
| 2007/0035751 A1* | 2/2007 | Presley et al. | 358/1.9 |
| 2007/0046958 A1* | 3/2007 | Hoof et al. | 358/1.9 |
| 2007/0081176 A1 | 4/2007 | Newman et al. | 358/1.9 |
| 2007/0195345 A1* | 8/2007 | Martinez et al. | 358/1.9 |
| 2008/0143738 A1* | 6/2008 | Woolfe et al. | 345/597 |
| 2009/0184975 A1* | 7/2009 | Yao et al. | 345/590 |
| 2009/0273797 A1* | 11/2009 | Winslow | 358/1.9 |

OTHER PUBLICATIONS

Holm, et al., "ICC Votable Proposal Submission: Perceptual Intent Reference Medium Color Gamut", Feb. 22, 2005.
Bourgoin, "Windows Color System: Evolution in the Microsoft Color Management Ecosystem", 2005 Microsoft Corp.
Vasudevan, et al., "Windows Color System Overview", Microsoft Corp.
"Windows Color System: The Next Generation Color Management System", Microsoft Corp., Published: Sep. 2005.
"Color Management with Mac OS X Tiger" Technology Tour Dec. 2005.

* cited by examiner

*Primary Examiner* — Kimberly A Williams
(74) *Attorney, Agent, or Firm* — Fitzpatrick, Cella, Harper & Scinto

(57) ABSTRACT

Preservation of rendering intent when a rendering model encapsulated in a transform-based profile is used in a measurement-based CMS. Source device color values are converted to generate perceptually rendered values using a perceptual transform of the transform-based color profile. Perceptually rendered appearance values of a color appearance space are generated by converting the perceptually rendered values using predefined ICC viewing conditions. Using a gamut mapping model (GMM), the generated appearance values are converted to generate destination device color values within a color gamut of a destination device. The GMM uses a PRMG boundary description and a gamut boundary description of the destination device to perform the mapping. A transform is constructed from the source device color values and the corresponding destination device color values. Color values of an image generated by the source device are converted to color values of a destination device using the constructed transform.

5 Claims, 4 Drawing Sheets

INTENT PRESERVATION WHEN CONSTRUCTING MEASUREMENT-BASED COLOR TRANSFORMS FROM TRANSFORM-BASED PROFILES

BACKGROUND OF THE INVENTION

1. Field of the Invention

The invention relates to color management systems, and more particularly relates to measurement-based color management systems that construct measurement-based color transforms from transform-based profiles.

2. Description of the Related Art

Color management systems (CMS) convert color between color device representations of a source and a destination color device. To perform this conversion, color values for a color space of the source device are converted into color values for a device-independent color space, and thereafter, these device-independent color values are converted into values for a color space of the destination device.

Some CMSs utilize transform-based color profiles for the conversion of color image data between device-dependent and device-independent color spaces. Such transform-based color profiles are often created by a hardware manufacturer of a given color device, such as a printer or a digital camera. Typically, transform-based color profiles are designed to meet the specifications set forth by the International Color Consortium (ICC).

A color transform contained in a transform-based profile can be used by a color management module (CMM) of the CMS to convert device-dependent color values into color values for a device-independent color space. For example, device-dependent RGB values used by a source device (e.g., a digital camera) can be converted, using the color transform, to device-independent color space values (e.g., LAB values). This device-independent color space is sometimes referred to as the Profile Connection Space (PCS). The PCS values can then be converted to a device-dependent color space of a destination device (e.g., a printer) by utilizing the same CMM in combination with the destination device's transform-based color profile.

Transform-based color profiles often contain multiple color transforms. Transforms are typically represented by combinations of matrices, 1-dimensional look-up tables (LUT), and n-dimensional LUTs for converting color values to PCS values (source transform), and for converting PCS values to a device-dependent color space, e.g., RGB, CMYK, (destination transform). The purpose of multiple transforms is to emphasize different rendering intents. Examples of different rendering intents are perceptual, saturation, relative-colorimetric, and absolute-colorimetric.

Because a source device (e.g., a digital camera) and a destination device (e.g., a printer) typically have different color gamuts with respect to each other, a gamut mismatch may occur, meaning that some colors within the source device's color space may not be represented within the destination device's color space. To achieve an intended reproduction of source colors on the destination device, color transforms typically encapsulate rendering "intents" (or rendering "models") used to render the image by mapping out-of-gamut colors from within the source device's color gamut to within the destination device's color gamut. For example, colorimetric transforms encapsulate colorimetric rendering intent which provides accurate color reproduction, and perceptual transforms encapsulate perceptual rendering intent which maps colors to preserve a preferred look.

For colorimetric intent, the PCS is an unbounded color space. Colorimetric transforms encapsulate colorimetric intent rendering models that attempt to maintain a near exact relationship between PCS colors and destination device colors. While colorimetric destination transforms change colors, colorimetric source transforms generally do not. The destination colorimetric transform rendering model performs rendering by converting colors that fall outside the destination device's color gamut to colors that can be represented by the destination device. All other colors are converted without change.

For perceptual intent, the PCS is a bounded color space that is limited to color values that can be reproduced on an idealized reference medium (i.e., the PCS perceptual intent reference medium). The PCS perceptual intent reference medium (PRM) and its color gamut (PRMG) have been standardized by the International Color Consortium (ICC).

Perceptual intent transforms encapsulate perceptual intent rendering models that map out-of-gamut colors to colors within the destination device's color space as part of a two-stage rendering process. In the first stage, source colors are rendered from the source device to the PRM, followed by the subsequent rendering from the PRM to the destination device. Rendering in the first stage is achieved using the source transform included in the color profile of the source device, and rendering in the second stage is achieved using the destination transform included in the color profile of the destination device. In both of these renderings, the color mapping is done in such a manner as to obtain a pleasing or otherwise desirable result.

Two gamut maps are used to map colors during creation of the source and destination profiles. When the source device profile is created, a profile builder applies a first gamut map to the source transform to map source device colors to colors within the PRMG. When the destination device profile is created, the profile builder applies a second gamut map to the destination transform to map colors within the PRMG to destination device colors. The source profile is created without knowledge of a destination device, and the destination profile is created without knowledge of a source device.

SUMMARY OF THE INVENTION

More recently, CMSs have been developed that perform a single-stage rendering process in which source colors are rendered from the source device directly to the destination device. Rendering is performed by a single gamut map that maps colors during the color conversion process, with knowledge of both the source and the destination device.

Additionally, measurement-based CMSs (MBCMS) have been developed in which the device profiles include actual measurements of the device's color characteristics, such as CIEXYZ tri-stimulus measurements of color patch data from a color target. These measurements are used by the MBCMS to construct transforms on-the-fly. These measurement-based transforms are used to convert between source device colors and destination device colors.

Measurement-based CMSs can use transform-based profiles by using the source colorimetric transform to determine the colorimetric behavior of the source device, and thereby model the source device as though measurements were actually presented. However, measurement-based CMSs cannot directly use a carefully constructed transform (e.g., a perceptual transform) with a look that the user wants to preserve.

The inventor herein has previously proposed a measurement-based color management system (MBCMS) in which color measurements are generated from transform-based color profiles for use in measurement-based CMSs. Image colors rendered by a source device (e.g., digital camera) are converted to colorimetric values using the colorimetric transform of a transform-based color profile, and a user-selectable gamut mapping model is used to render the image from within the source device color gamut to within a destination device color gamut. See U.S. Publication No. 2005/0249403, "Generation of Color Measurements from Transform-Based Color Profiles", and U.S. Publication No. 2007/0081176, "Computation of Gamut Boundary By Sampling Device-Independent Color Space", the entire contents of which are incorporated by reference as if set forth in full herein.

FIG. 1 depicts a workflow in which measurements generated from a transform-based profile are used in a measurement-based CMS. As seen there, device models use information contained within device profiles to convert colors from a source device's color space to a destination device's color space. Source device model 10 uses the colorimetric transform of transform-based source device profile 50 to convert source device colors (colorants) 1 to source device colorimetric values 12 in the CIEXYZ color space. These source device colorimetric values 12 are then converted to appearance values 22 (e.g., in the CIECAM02 JCh color appearance space) by color appearance model 20, which uses source device viewing conditions obtained from appearance model profile 60 to perform the conversion.

Gamut mapping model 40 then uses a gamut boundary description 30 for the source device and a gamut boundary description 31 for the destination device to convert source device color appearance values 22 to destination device color appearance values 23. The gamut mapping model 40 is selected by a user.

Next, destination device color appearance values 23 are converted to destination device calorimetric values 13 by color appearance model 21, which uses destination device viewing conditions obtained from appearance model profile 61 to perform an inverse conversion. Finally, destination device model 11 uses destination device profile 51 to convert destination device calorimetric values 13 to destination device colors (colorants) 2.

In the foregoing explanation, a transform-based profile was associated with the source device, and a measurement-based profile with the destination device. It should be recognized that this selection was intended only to assist in clarity of explanation, and that the transform-based profile could have been associated with the destination device, or with both the source and destination devices.

In some scenarios, a user that is using a measurement-based CMS may want to use the perceptual rendering model that is encapsulated in the transform-based profile rather than selecting a gamut mapping model that is available in the system. For example, a user may want to use a carefully constructed transform-based profile (e.g., a profile containing a perceptual transform) with a look that the user wants to preserve. Current implementations of measurement-based color management do not support this workflow.

Thus, in one example embodiment, color management uses a perceptual rendering model encapsulated in a transform-based profile in a measurement-based color management system (MBCMS). Source device color values in a predetermined collection of source device color values are converted to generate perceptually rendered values using a perceptual transform of the transform-based color profile. Perceptually rendered appearance values of a color appearance space are generated by converting the perceptually rendered values using predefined viewing conditions. Using a gamut mapping model, the generated appearance values are converted to generate destination device color values within a color gamut of a destination device. The gamut mapping model uses a perceptual intent reference medium gamut (PRMG) boundary description and a gamut boundary description of the destination device to perform the mapping. The PRMG represents the color gamut of an idealized medium. A measurement-based color transform is constructed from the predetermined collection of source device color values and the corresponding destination device color values generated by the gamut mapping model. Color values of an image generated by the source device are converted to color values of a destination device using the constructed transform.

In this manner, a user may use the perceptual rendering model that is encapsulated in the transform-based profile in a measurement-based CMS.

The perceptual intent reference medium gamut (PRMG) used can be the one defined by the International Color Consortium (ICC). Transform-based profiles can include ICC color profiles.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION

Figure 1:
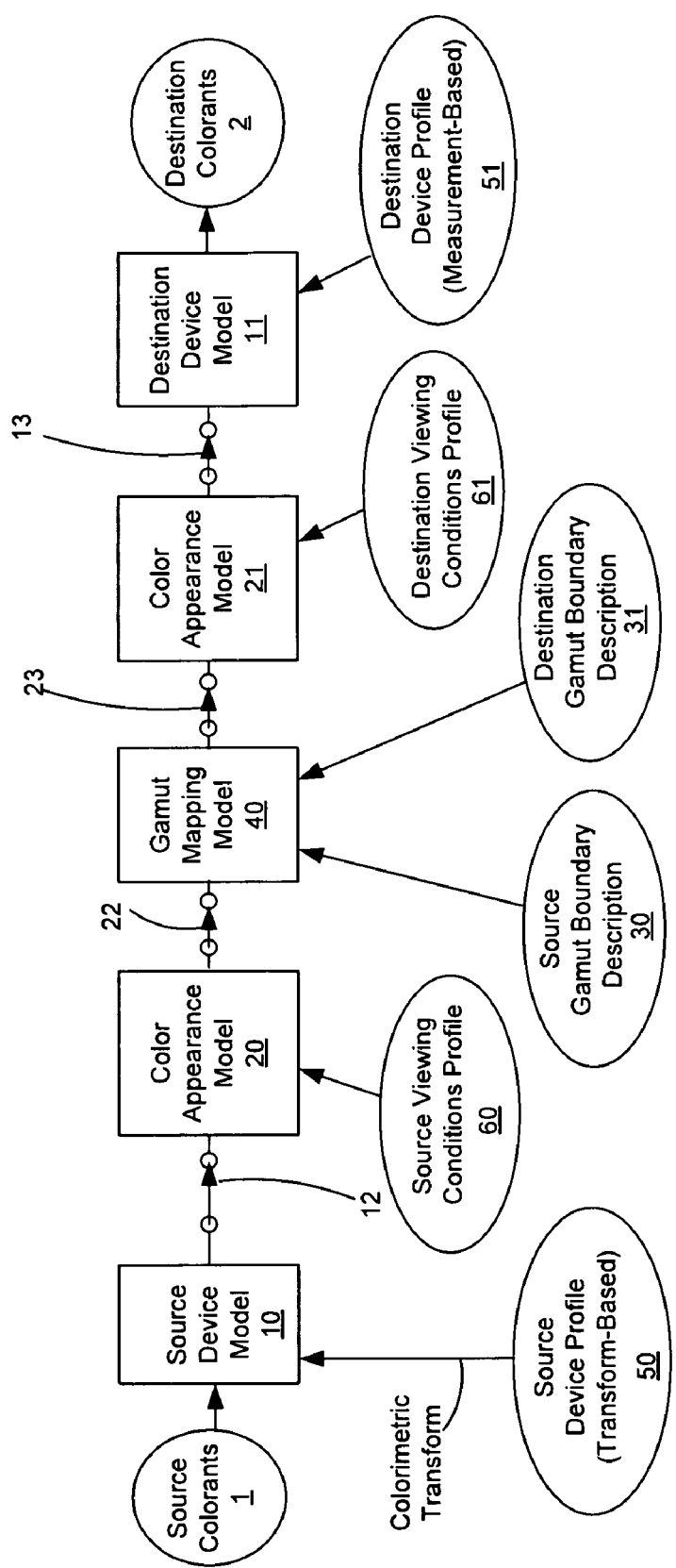
FIG. 1 depicts a workflow of a measurement-based CMS.
Figure 2:
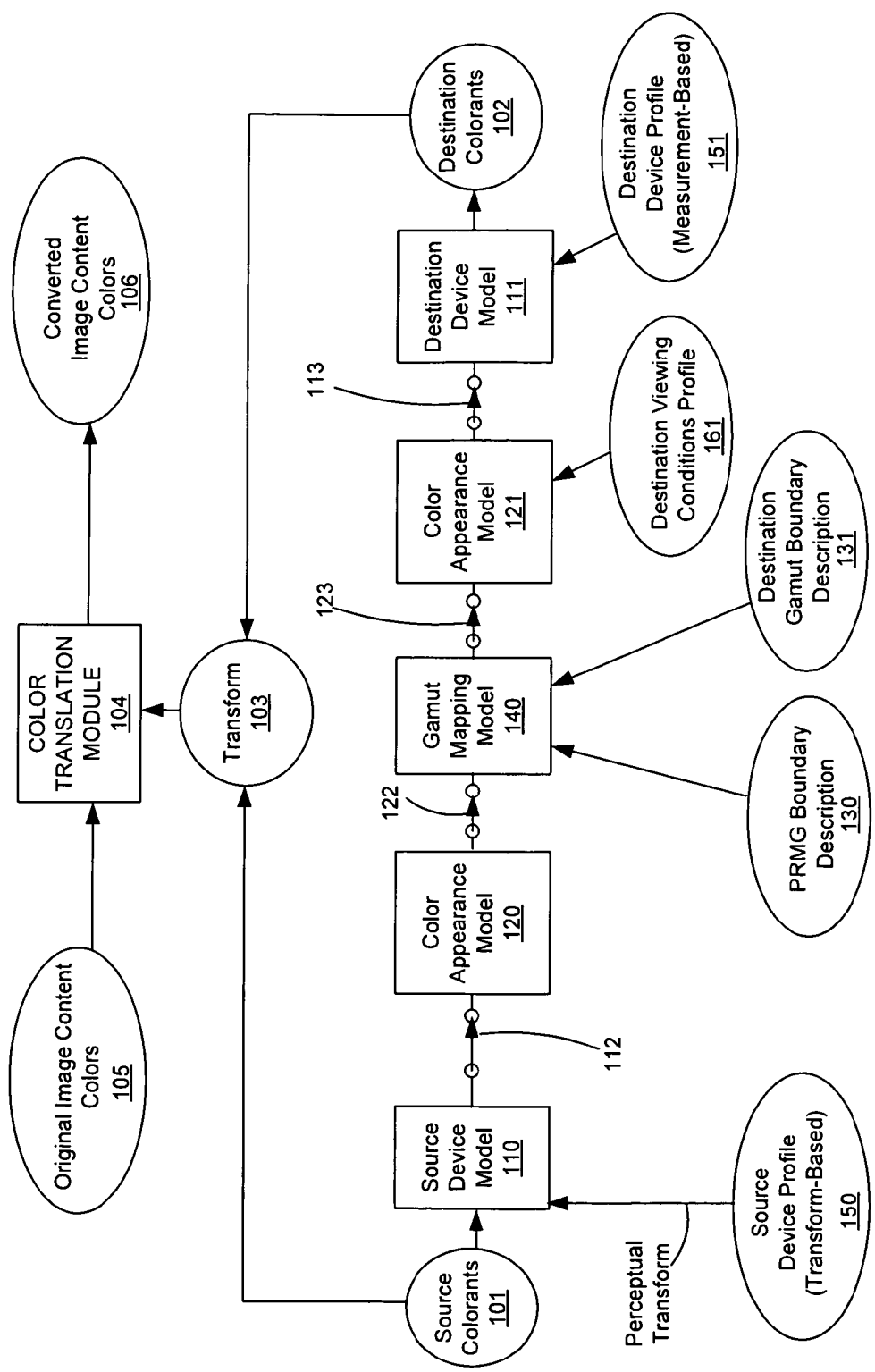
FIG. 2 depicts a workflow of a measurement-based CMS, according to an example embodiment of the invention.

FIG. 2 depicts a workflow of a measurement-based CMS (MBCMS), according to an example embodiment of the invention. As seen there, destination device colors (colorants) 102 corresponding to a predetermined collection of source device colors (colorants) 101 are generated.

The MBCMS can be, for example, a Canon Kyuanos CMS, or any other MBCMS. The MBCMS could be implemented as a separate DLL, as part of a device driver such as a scanner or printer, as a stand-alone program, or as an integral part of the operating system itself, or the like.

Source device colors 101 are generated by a digital image input device (not shown), such as, for example, a digital camera, a scanner, or any other type of digital image input device. Destination device colors 102 are colors capable of being output by a destination device (not shown), such as, for example, a printer or a monitor.

Source device profile 150 is a transform-based color profile that includes a perceptual transform. The perceptual transform converts color values of the source device to colors within the PRMG. In this example embodiment of the invention, device profiles 150 and 151 are International Color Consortium (ICC) color profiles, and destination device profile 151 is a measurement-based profile. In other embodiments, destination device profile 151 can be any type of device profile, such as, for example, a transform-based profile. Source device profile 150 and destination device profile 151 are provided by the respective device vendors and installed by a user, but in other embodiments, profile 150 and/or 151 can be included as part of the MBCMS. Profiles 150 and 151 are user-selectable, but in other embodiments, profile 150 and/or 151 can be automatically selected by the MBCMS.

In this example embodiment, a transform-based profile is associated with the source device, and a measurement-based profile is associated with the destination device. It should be recognized that this selection was intended only to assist in clarity of explanation, and that in other embodiments, the transform-based profile may be associated with the destination device, or with both the source and destination devices.

Perceptual intent Reference Medium Gamut (PRMG) boundary description 130 describes the gamut boundary of an idealized medium and is defined by the ICC. See Holm, et. al., "ICC Votable Proposal Submission: Perceptual Intent Reference Medium Color Gamut", Feb. 22, 2005, the entire contents of which are incorporated by reference as if set forth in full herein. PRMG boundary description 130 is included as part of the MBCMS, but in other embodiments, PRMG boundary description 130 can be separately provided and installed by a user.

Appearance model profile 161 contains viewing conditions for the destination device. Profile 161 is separately provided and installed by a user, but in other embodiments, profile 161 can be included as part of the MBCMS. Profile 161 is user-selectable, but in other embodiments, profile 161 can be automatically selected by the MBCMS.

Source device model 110, destination device model 111, color appearance models 120 and 121, and gamut mapping model 140 are software modules that are be provided by the MBCMS. However, in other embodiments, source device model 110, destination device model 111, color appearance models 120 and 121, and/or gamut mapping model 140 can be separately provided as plug-in modules by, for example, a device vendor.

According to this example embodiment, source device model 110 uses the perceptual transform of transform-based source device profile 150 to convert source device colors 101 to perceptually rendered source device values 112 within the PRMG. In this example embodiment in which source device profile 150 is an ICC color profile, the perceptual transform is embodied as an N-dimensional look-up table. The domain of the look-up table contains all possible source device color combinations, and the domain of the look-up table is the corresponding PCS values for each of the source device colors in the domain. The look-up table contains a value for each combination of a sampling of source color components across the full range of device values. PCS values for source device colors that are not included in the sampling are computed using an interpolation of the values for the surrounding source device colors. These PCS colors are represented in the CIEXYZ color space.

The perceptually rendered source device values 112 are then converted to perceptually rendered appearance values 122 (e.g., in the CIECAM02 JCh color appearance space) by color appearance model 120, which uses source device viewing conditions of the PCS to perform the conversion. The source device viewing conditions are predefined ICC viewing conditions.

In this example embodiment, gamut mapping model 140 then uses PRMG boundary description 130 and the gamut boundary description 131 of the destination device to convert source device color appearance values 122 to destination device color appearance values 123. In the example embodiment, the gamut mapping model 140 may be any gamut mapping model but is often the colorimetric intent gamut mapping model.

Next, destination device color appearance values 123 are converted to destination device colorimetric values 113 by color appearance model 121, which uses destination device viewing conditions obtained from appearance model profile 161 to perform an inverse conversion. Finally, destination device model 111 uses destination device profile 151 to convert destination device colorimetric values 113 to destination device colors (colorants) 102.

In this embodiment, the predetermined collection of source device colors 101 and the corresponding generated destination device colors 102 form measurement-based color transform 103 that is used to convert image content colors of an image generated by the source device to image content colors of the destination device. For example, transform 103 can be used to transform colors 105 of an image generated by a digital camera to colors 106 in the color space of a printer.

Transform 103 is often represented as a look-up table (LUT), but in other embodiments, transform 103 can be represented by other means. Color translation module 104 performs the color conversion process. Color translation module 104 can be implemented as any combination of hardware and/or software modules.

When performing color conversion, if a color included in image content colors 105 is represented in transform 103, color translation module 104 retrieves the corresponding color 106 in the destination device's color space from transform 103. If a color included in image content colors 105 is not represented in transform 103, color translation module 104 performs an interpolation process using transform 103 to interpolate a color 106 from the source device color 105.

Figure 3:
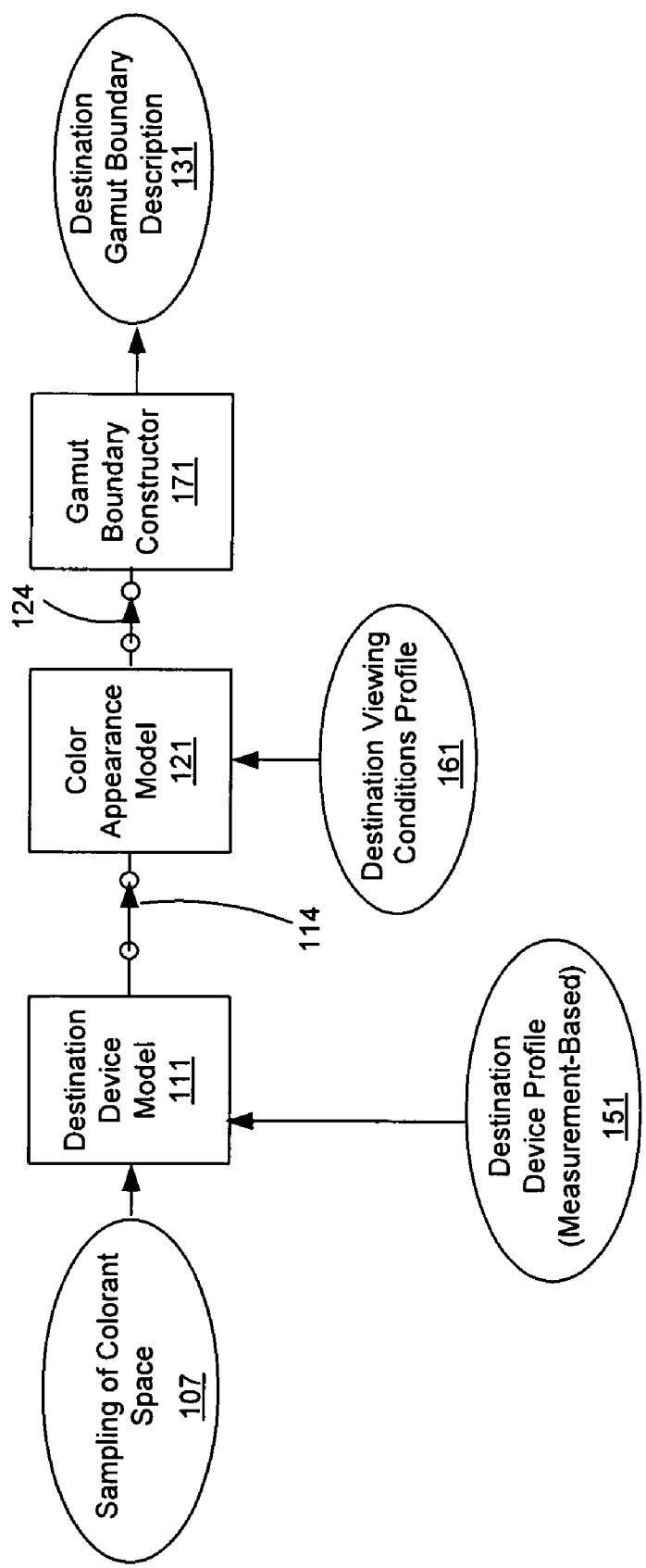
FIG. 3 depicts the construction of a gamut boundary description, according to an example embodiment of the invention.

FIG. 3 depicts the construction of the gamut boundary description 131 for the destination device, according to this example embodiment. Gamut boundary constructor 171 is a software module that is provided by the MBCMS. Destination device gamut colors 107 represent a sampling of all possible colors that can be reproduced by the destination device.

Destination device model 111 uses destination device profile 151 to convert destination device gamut colors 107 to destination device gamut values in the CIEXYZ color space. Destination device gamut values 114 are then converted into appearance values 124 (e.g., in the CIECAM02 JCh color appearance space) by color appearance model 121, which uses destination device viewing conditions obtained from appearance model 161 to perform the conversion. Gamut boundary constructor 171 then uses the appearance values 124 produced by color appearance model 121 to generate gamut boundary description 131.

Figure 4:
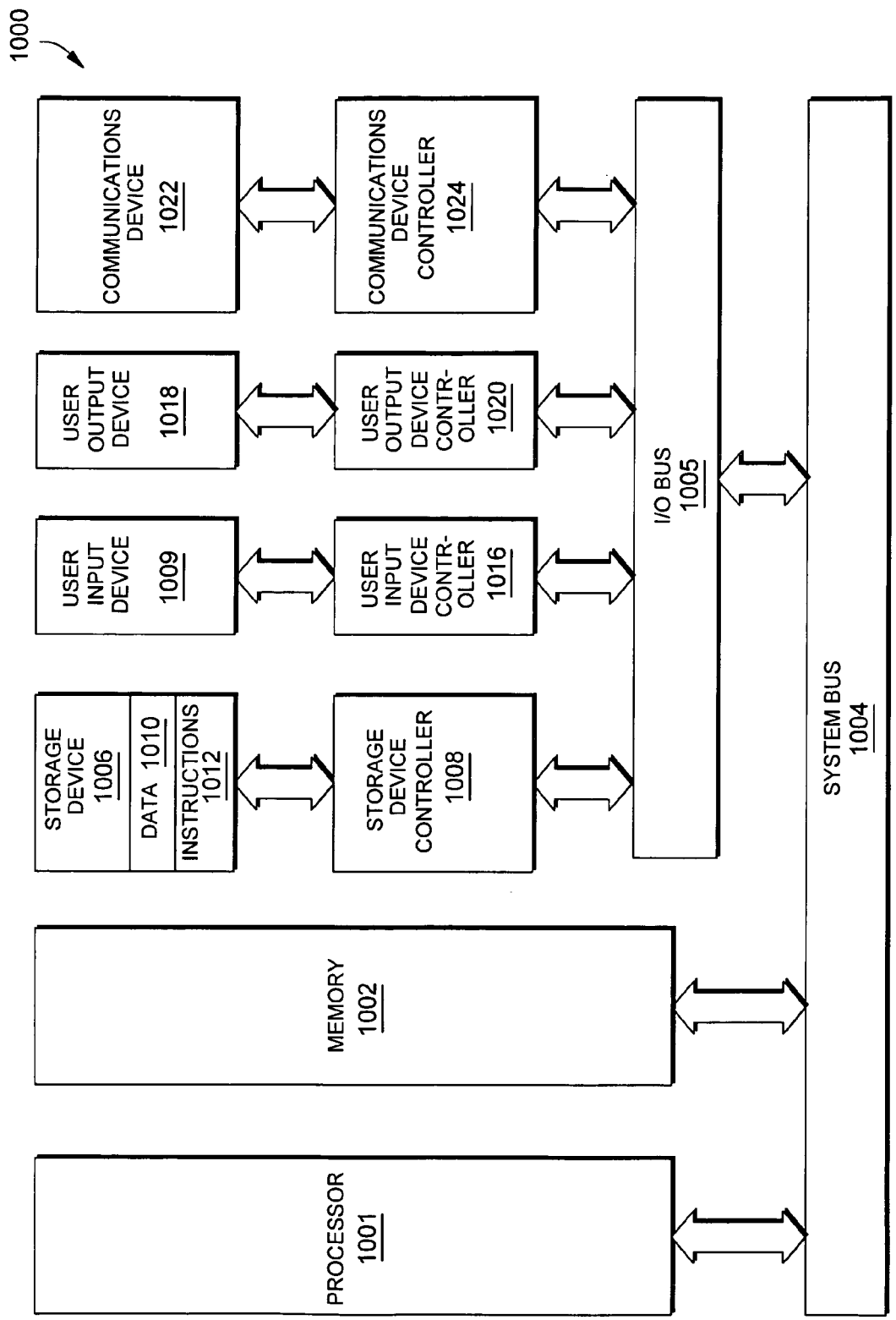
FIG. 4 is an architecture diagram for a data processing apparatus, such as a general purpose computing machine, suitable for performing color management processes in accordance with an example embodiment of the invention.

FIG. 4 is an architecture diagram for a data processing apparatus, such as a general purpose computing machine, programmed to perform the processes described above for FIGS. 2 and 3. The data processing apparatus 1000 includes a processor 1001 coupled to a memory 1002 via system bus 1004. The processor is also coupled to external Input/Output (I/O) devices via the system bus and an I/O bus 1005. A storage device having computer-readable media 1006 is coupled to the processor via a storage device controller 1008 and the I/O bus and the system bus. The storage device is used by the processor to store and read data 1010 and program instructions 1012 used to implement the color management processes as described above.

Program instructions 1012 include, for example, MBCMS program instructions and program instructions for plug-in models used by the MBCMS. More specifically, program instructions 1012 include program instructions for software modules 104, 110, 111, 120, 121, 140, and 171 of FIGS. 2 and 3.

Data 1010 includes, for example, profiles used by the MBCMS, such as profiles 150, 151, 161, transform 103, and image content colors 105 and 106. Data 1010 also includes, for example, device colors 101 and 102, and gamut boundary descriptions 130 and 131.

The processor may be further coupled to a user output device 1018 via a user output device controller 1020 coupled to the I/O bus. The processor may be further coupled to a user input device 1009 via a user input device controller 1016 coupled to the I/O bus.

The processor may be further coupled to a communications device 1022 via a communications device controller 1024 coupled to the I/O bus. The processor may use the communications device to communicate with another device for transferring a profile, plug-in model, and/or an image. Examples of devices that may be coupled to communications device 1022 include printers, scanners, digital cameras, and digital video cameras. The processor may also use the communications device to receive program instructions and data from the Internet, or any other type of network.

In operation, the processor loads the program instructions from the storage device into the memory. The processor executes the loaded program instructions to implement the color management processes as described above.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A color management method for using a rendering model encapsulated in a transform-based profile in a measurement-based color management system (MBCMS), the method comprising:
    converting a predetermined collection of source device color values to generate perceptually rendered values using the rendering model encapsulated in a perceptual transform of the transform-based color profile;
    converting the perceptually rendered values to generate perceptually rendered appearance values of a color appearance space using predefined viewing conditions;
    mapping the generated appearance values to generate destination device color values within a color gamut of a destination device using a gamut mapping model, wherein the gamut mapping model uses a perceptual intent reference medium gamut (PRMG) boundary description and a gamut boundary description of the destination device to perform the mapping, wherein the PRMG represents the color gamut of an idealized medium;
    constructing a measurement-based color transform from the predetermined collection of source device color values and the corresponding destination device color values generated by the gamut mapping model; and
    converting color values of an image generated by the source device to color values of the destination device using the constructed transform.

2. The color management method of claim 1, wherein the perceptual intent reference medium gamut (PRMG) is defined by the International Color Consortium (ICC).

3. The color management method of claim 1, wherein transform-based profiles include International Color Consortium (ICC) color profiles.

4. A computer readable storage medium storing a computer-executable color management program, the color management program being executable by a computer so as to control the computer to perform a method for using a rendering model encapsulated in a transform-based profile in a measurement-based color management system (MBCMS), the method comprising:
    converting a predetermined collection of source device color values to generate perceptually rendered values using the rendering model encapsulated in a perceptual transform of the transform-based color profile;
    converting the perceptually rendered values to generate perceptually rendered appearance values of a color appearance space using predefined viewing conditions;
    mapping the generated appearance values to generate destination device color values within a color gamut of a destination device using a gamut mapping model, wherein the gamut mapping model uses a perceptual intent reference medium gamut (PRMG) boundary description and a gamut boundary description of the destination device to perform the mapping, wherein the PRMG represents the color gamut of an idealized medium;
    constructing a measurement-based color transform from the predetermined collection of source device color values and the corresponding destination device color values generated by the gamut mapping model; and
    converting color values of an image generated by the source device to color values of the destination device using the constructed transform.

5. A color management apparatus comprising:
    a storage device; and
    a processor coupled to the storage device,
    wherein the processor executes a computer-executable color management program stored on the storage device, the color management program being executable by the processor so as to control the color management apparatus to perform a method for using a rendering model encapsulated in a transform-based profile in a measurement-based color management system (MBCMS), the method comprising:
    converting a predetermined collection of source device color values to generate perceptually rendered values using the rendering model encapsulated in a perceptual transform of the transform-based color profile;
    converting the perceptually rendered values to generate perceptually rendered appearance values of a color appearance space using predefined viewing conditions;
    mapping the generated appearance values to generate destination device color values within a color gamut of a destination device using a gamut mapping model, wherein the gamut mapping model uses a perceptual intent reference medium gamut (PRMG) boundary description and a gamut boundary description of the destination device to perform the mapping, wherein the PRMG represents the color gamut of an idealized medium;
    constructing a measurement-based color transform from the predetermined collection of source device color values and the corresponding destination device color values generated by the gamut mapping model; and
    converting color values of an image generated by the source device to color values of the destination device using the constructed transform.

* * * * *